US012809699B2

(12) United States Patent
Lee et al.

(10) Patent No.: US 12,809,699 B2
(45) Date of Patent: Nov. 24, 2026

(54) APPARATUS AND METHOD FOR REDUCING DELAY OF BUFFERING IN SHORT RANGE WIRELESS COMMUNICATION SYSTEM

(71) Applicant: LG ELECTRONICS INC., Seoul (KR)

(72) Inventors: Hyeonjae Lee, Seoul (KR); Jongmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 710 days.

(21) Appl. No.: 18/208,169

(22) Filed: Jun. 9, 2023

(65) Prior Publication Data

US 2023/0401115 A1 Dec. 14, 2023

(30) Foreign Application Priority Data

Jun. 9, 2022 (KR) ........................ 10-2022-0070314

(51) Int. Cl.
*G06F 9/54* (2006.01)
*H04L 49/60* (2022.01)

(52) U.S. Cl.
CPC .............. *G06F 9/544* (2013.01); *G06F 9/542* (2013.01); *H04L 49/60* (2013.01)

(58) Field of Classification Search
CPC ........... G06F 9/544; G06F 9/542; H04L 49/60
See application file for complete search history.

(56) References Cited

U.S. PATENT DOCUMENTS

2004/0152417 A1* 8/2004 Kim ...................... H04W 36/02 455/436
2009/0010202 A1* 1/2009 Masayuki ........... H04W 72/569 370/328

(Continued)

FOREIGN PATENT DOCUMENTS

WO WO-2022222648 A1 * 10/2022 ............ H04W 56/00

*Primary Examiner* — Chuong M Nguyen
(74) *Attorney, Agent, or Firm* — LEE, HONG, DEGERMAN, KANG & WAIMEY

(57) ABSTRACT

According to various embodiments of the present disclosure, a method of operating a first apparatus in a short-range wireless communication system, the first apparatus includes: a first processor corresponding to a host stack; a second processor corresponding to a first controller stack; a memory; and a transceiver, wherein the host stack and the first controller stack are connected through a host controller interface (HCI), the method includes: in relation to data transport from the first controller stack of the first apparatus to a second controller stack of a second apparatus, transporting, from the first processor to the second processor, HCI command information configured so that there is no buffering in the first controller stack; transporting a plurality of service data units (SDUs) generated by the first processor to the second processor—each of the plurality of SDUs is transported to the second processor apart at each configured sub interval—; and based on the HCI command information, transporting, by the transceiver, each of a plurality of protocol data units (PDUs) based on each of the plurality of SDUs to the second apparatus without buffering after each of the plurality of SDUs is received by the second processor, wherein transport of the plurality of PDUs is performed within one isochronous event.

12 Claims, 17 Drawing Sheets

(56) References Cited

U.S. PATENT DOCUMENTS

| | | | | |
|---|---|---|---|---|
| 2012/0039174 | A1* | 2/2012 | Robin | H04L 12/413<br>370/235.1 |
| 2013/0276038 | A1* | 10/2013 | Kiura | H04N 21/226<br>725/88 |
| 2022/0078541 | A1* | 3/2022 | Zhu | H04R 1/1041 |
| 2022/0256314 | A1* | 8/2022 | Lee | H04W 4/06 |
| 2024/0049116 | A1* | 2/2024 | Choi | H04W 76/14 |

* cited by examiner

FIG. 6

SDU_Interval_C_To_P: Size: 3 octets

| Value | Parameter Description |
|---|---|
| 0x0000FF to 0x0FFFFF | The interval, in microseconds, of periodic SDUs. |
| All other values | Reserved for future use |

Max_Transport_Latency_C_To_P: Size: 2 octets

| Value | Parameter Description |
|---|---|
| 0x0005 to 0x0-FA0 | Maximum transport latency, in milliseconds, from the Central's Controller to the Peripheral's Controller. |
| All other values | Reserved for future use |

FIG. 11

Max_Transport_Latency_C_To_P: Size: 2 octets

| Value | Parameter Description |
|---|---|
| 0x0005 to 0x0-FA0 | Maximum transport latency, in milliseconds, from the Central's Controller to the Peripheral's Controller. |
| All other values | Reserved for future use |

APPARATUS AND METHOD FOR REDUCING DELAY OF BUFFERING IN SHORT RANGE WIRELESS COMMUNICATION SYSTEM

CROSS-REFERENCE TO RELATED APPLICATION(S)

Pursuant to 35 U.S.C. § 119(a), this application claims the benefit of earlier filing date and right of priority to Korean Patent Application No. 10-2022-0070314, filed on Jun. 9, 2022, the contents of which are hereby incorporated by reference herein in its entirety.

BACKGROUND OF THE INVENTION

Field of the Invention

The present disclosure relates to an apparatus and method for reducing delay of buffering in a short-range wireless communication system. Specifically, the present disclosure relates to an apparatus and method capable of achieving a fast interval as a result of eliminating buffering for packets before an ISO interval in multiple connected isochronous stream (CIS) where service data unit (SDU) arrival is slow (10 ms+), for example, in synchronization for two CIS channels (low energy (LE) audio left and right).

Description of the Related Art

The current core mainly describes multiple connected isochronous streams (CIS) where service data unit (SDU) arrival is slow (10 ms+). For example, the description of the SDU synchronization reference is for synchronization of two CIS channels (low energy (LE) audio left and right). The Transport_Latency equation for synchronization may consequently be interpreted as fast interval not being achieved because packets must be buffered before the ISO interval.

The synchronization reference is a time reference of the SDU that allows synchronization of isochronous data in multiple apparatus.

There is no clear description of a single CIS with fast SDU arrival (1 ms to 5 ms) that does not require synchronization. The core HCI command (HCI_LE_Set_CIG_Parameters) has an SDU interval of 0xFF to 0xFFFFF us (minimum 255 us) and a MAX Transport latency of 0x05 to 0xFA0 ms.

The packet may be sent within the max transport latency (i.e. the packet may be transported immediately). To this end, a max transport latency of 0x00 may be explicitly added. If the controller is commanded to set a single CIS with fast SDU arrival, the best result is to send the SDU as soon as possible without buffering.

SUMMARY OF THE INVENTION

In order to solve the above-described problem, the present disclosure provides a method and apparatus that can achieve fast intervals as a result of eliminating buffering for packets before ISO intervals in multiple connected isochronous streams (CIS) with slow service data unit (SDU) arrivals (10 ms+), for example, in synchronization for two CIS channels (low energy (LE) audio left and right).

The present disclosure provides an apparatus and method capable of sending a packet within a max transport latency. To this end, a max transport latency of 0x00 may be explicitly added. If the controller is commanded to set a single CIS with fast SDU arrival, the best result is to send the SDU as soon as possible without buffering.

The technical objects of the present disclosure are not limited to the aforementioned technical objects, and other technical objects, which are not mentioned above, will be apparently appreciated by a person having ordinary skill in the art from the following description.

According to various embodiments of the present disclosure, a method of operating a first apparatus in a short-range wireless communication system, the first apparatus comprises: a first processor corresponding to a host stack; a second processor corresponding to a first controller stack; a memory; and a transceiver, wherein the host stack and the first controller stack are connected through a host controller interface (HCI), the method comprises: in relation to data transport from the first controller stack of the first apparatus to a second controller stack of a second apparatus, transporting, from the first processor to the second processor, HCI command information configured so that there is no buffering in the first controller stack; transporting a plurality of service data units (SDUs) generated by the first processor to the second processor—each of the plurality of SDUs is transported to the second processor apart at each configured sub interval—; and based on the HCI command information, transporting, by the transceiver, each of a plurality of protocol data units (PDUs) based on each of the plurality of SDUs to the second apparatus without buffering after each of the plurality of SDUs is received by the second processor, wherein transport of the plurality of PDUs is performed within one isochronous event.

According to various embodiments of the present disclosure, a method of operating a second apparatus in a short-range wireless communication system, the second apparatus comprises: a first processor corresponding to a host stack; a second processor corresponding to a second controller stack; a memory; and a transceiver, wherein the host stack and the second controller stack are connected through a host controller interface (HCI), the method comprises: in relation to data reception from a first controller stack of a first apparatus to the second controller stack of the second apparatus, transporting, from the first processor to the second processor, HCI command information configured so that there is no buffering in the second controller stack; receiving a plurality of protocol data units (PDUs) from the first apparatus by the transceiver—each of the plurality of PDUs is received apart at each configured sub interval—; and based on the HCI command information, transporting each of the plurality of PDUs from the second processor to the first processor without buffering after receiving each of the plurality of PDUs, wherein reception of the plurality of PDUs is performed within one isochronous event.

According to various embodiments of the present disclosure, a first apparatus in a short-range wireless communication system, the first apparatus comprises: a first processor corresponding to a host stack; a second processor corresponding to a first controller stack; a memory; and a transceiver, wherein the host stack and the first controller stack are connected through a host controller interface (HCI), wherein the memory store instructions for performing operations based on being executed by the first processor and the second processor, and wherein the operations are provided in a first apparatus including all steps of an operating method of the first apparatus according to various embodiments of the present disclosure.

In order to solve the above-described problem, the present disclosure can provide a method and apparatus that can achieve fast intervals as a result of eliminating buffering for packets before ISO intervals in multiple connected isochronous streams (CIS) with slow service data unit (SDU) arrivals (10 ms+), for example, in synchronization for two CIS channels (low energy (LE) audio left and right).

The present disclosure can provide an apparatus and method capable of sending a packet within a max transport latency. To this end, a max transport latency of 0x00 may be explicitly added. If the controller is commanded to set a single CIS with fast SDU_arrival, the best result is to send the SDU as soon as possible without buffering.

BRIEF DESCRIPTION OF THE DRAWINGS

The drawings attached below are intended to aid understanding of the present disclosure, and may provide embodiments of the present disclosure together with a detailed description. However, the technical features of the present disclosure are not limited to specific drawings, and features disclosed in each drawing may be combined with each other to constitute a new embodiment. Reference numerals in each drawing may mean structural elements.

FIG. 6 illustrates an example of a parameter for determining a service data unit (SDU) interval and a max transport latency in a wireless communication system according to various embodiments of the present disclosure.

FIG. 11 illustrates an example of a parameter for determining a max transport latency in a wireless communication system according to various embodiments of the present disclosure.

DETAILED DESCRIPTION OF THE EMBODIMENTS

In various embodiments of the present disclosure, “A or B” may mean “only A”, “only B” or “both A and B.” In other words, in various embodiments of the present disclosure, “A or B” may be interpreted as “A and/or B”. For example, in various embodiments of the present disclosure, “A, B, or C” may mean “only A”, “only B”, “only C”, or “any combination of A, B, C”.

A slash (/) or comma used in various embodiments of the present disclosure may mean “and/or”. For example, “A/B” may mean “A and/or B”. Accordingly, “A/B” may mean “only A”, “only B”, or “both A and B”. For example, “A, B, C” may mean “A, B, or C”.

In various embodiments of the present disclosure, “at least one of A and B” may mean “only A”, “only B”, or “both A and B”. In addition, in various embodiments of the present disclosure, the expression “at least one of A or B” or “at least one of A and/or B” may be interpreted as “at least one of A and B”.

In addition, in various embodiments of the present disclosure, “at least one of A, B, and C” may mean “only A”, “only B”, “only C”, or “any combination of A, B, and C”. In addition, “at least one of A, B, or C” or “at least one of A, B, and/or C” may mean “at least one of A, B, and C”.

Figure 1:
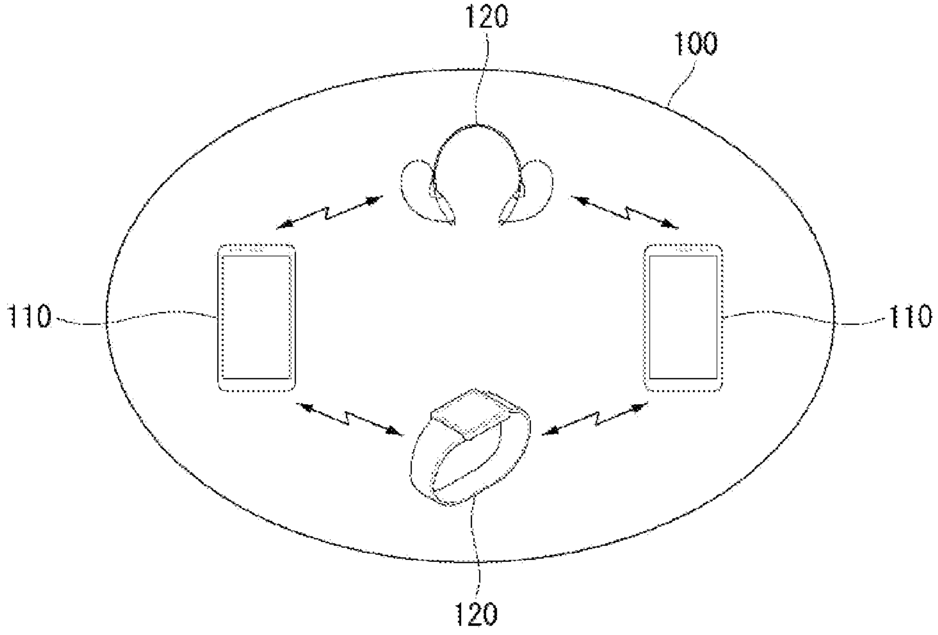
FIG. 1 is a schematic view illustrating an example of a wireless communication system using a Bluetooth low energy technology proposed in the present disclosure.

FIG. 1 is a schematic view illustrating an example of a wireless communication system using a Bluetooth low energy technology to which the present disclosure is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, a second device, etc.

The client device 110 may be expressed as a master device, a master, a client, a member, a sensor device, a sink device, a collector, a third device, a fourth device, etc.

The server device and the client device correspond to main components of the wireless communication system and the wireless communication system may include other components other than the server device and the client device.

The server device refers to a device that receives data from the client device, communicates directly with the client device, and provides data to the client device through a response when receiving a data request from the client device.

Further, the server device sends a notice/notification message and an indication message to the client device in order to provide data information to the client device. In addition, when the server device transmits the indication message to the client device, the server device receives a confirm message corresponding to the indication message from the client device.

Further, the server device may provide the data information to a user through a display unit or receive a request input from the user through a user input interface in the process of transmitting and receiving the notice, indication, and confirm messages to and from the client device.

In addition, the server device may read data from a memory unit or write new data in the corresponding memory unit in the process of transmitting and receiving the message to and from the client device.

Further, one server device may be connected to multiple client devices and may be easily reconnected to the client devices by using bonding information.

The client device 120 refers to a device that requests the data information or data transmission to the server device.

The client device receives the data from the server device through the notice message, the indication message, etc., and when receiving the indication message from the server device, the client device sends the confirm message in response to the indication message.

Similarly, the client device may also provide information to the user through the display unit or receive an input from the user through the user input interface in the process of transmitting and receiving the messages to and from the server device.

In addition, the client device may read data from the memory unit or write new data in the corresponding memory unit in the process of transmitting and receiving the message to and from the server device.

Hardware components such as the display unit, the user input interface, and the memory unit of the server device and the client device will be described in detail in FIG. 2.

Further, the wireless communication system may configure personal area networking (PAN) through Bluetooth technology. As an example, in the wireless communication system, a private piconet between the devices is established to rapidly and safely exchange files, documents, and the like.

Figure 2:
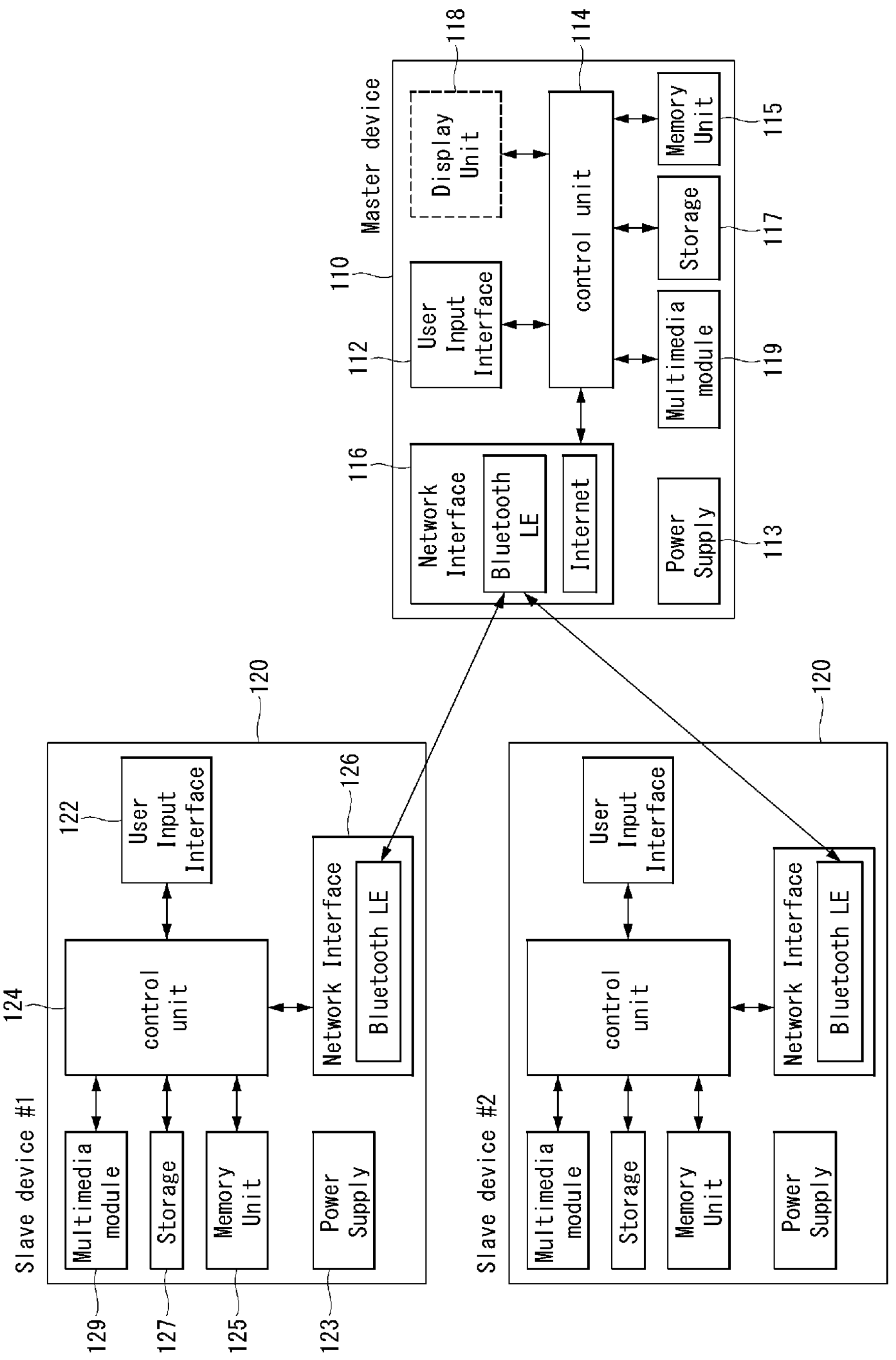
FIG. 2 shows an example of an internal block diagram of a device capable of implementing methods proposed in the present disclosure.

FIG. 2 shows an example of an internal block diagram of a device capable of implementing methods proposed in the present disclosure.

As shown in FIG. 2, a master device 110 includes an input unit (user input interface) 112, a power supply unit 113, a control unit 114, a memory unit 115, a network interface 116 including a Bluetooth interface, a storage 117, an output unit (display unit) 118, and a multi media module 119.

The input unit (user input interface) 112, the power supply unit 113, the control unit 114, the memory unit 115, the network interface 116 including the Bluetooth interface, the storage 117, the output unit (display unit) 118, and the multi media module 119 are functionally connected to each other to perform the method proposed in the present disclosure.

In addition, as shown in FIG. 2, slave devices (#1 and #2) 120 include an input unit (user input interface) 122, a power supply unit 123, a control unit 124, a memory unit 125, a network interface 126 including a Bluetooth interface, a storage 127, an output unit (display unit) 128, a multi media module 129.

The input unit (user input interface) 122, the power supply unit 123, the control unit 124, the memory unit 125, the network interface 126 including the Bluetooth interface, the storage 127, the output unit (display unit) 128, the multi media module 129 are functionally connected to each other to perform the method proposed in the present disclosure.

The Bluetooth interface 116, 126 refers to a unit (or module) capable of transmitting a request/response, command, notification, indication/confirm message, or data between devices using the Bluetooth technology.

The memory 115, 125 is implemented in various types of devices and refers to a unit in which various data is stored. Also, the storages 117 and 127 refer to units that perform a function similar to that of a memory.

The processor 114, 124 refers to a module for controlling an overall operation of the master device 110 or the slave device 120, and controls the server device or the client device in order in order to request the transmission of a message through the Bluetooth interface or other interface and to process a received message.

The processors 114 and 124 may include an application-specific integrated circuit (ASIC), another chipset, a logic circuit, and/or a data processing device.

The memory units 115 and 125 may include a read-only memory (ROM), a random access memory (RAM), a flash memory, a memory card, a storage medium, and/or other storage devices.

The memories 115 and 125 may be internal or external to the processors 114 and 124, and may be connected to the processors 114 and 124 by various well-known means.

The output units 118 and 128 refer to modules for providing device state information and message exchange information to the user through a screen.

The power supply units 113 and 123 refer to modules that receive external power and internal power under the control of the control unit and supply power required for operating each of the components.

As described above, the BLE technology may have a small duty cycle and significantly reduce power consumption through low data rate.

Figure 3:
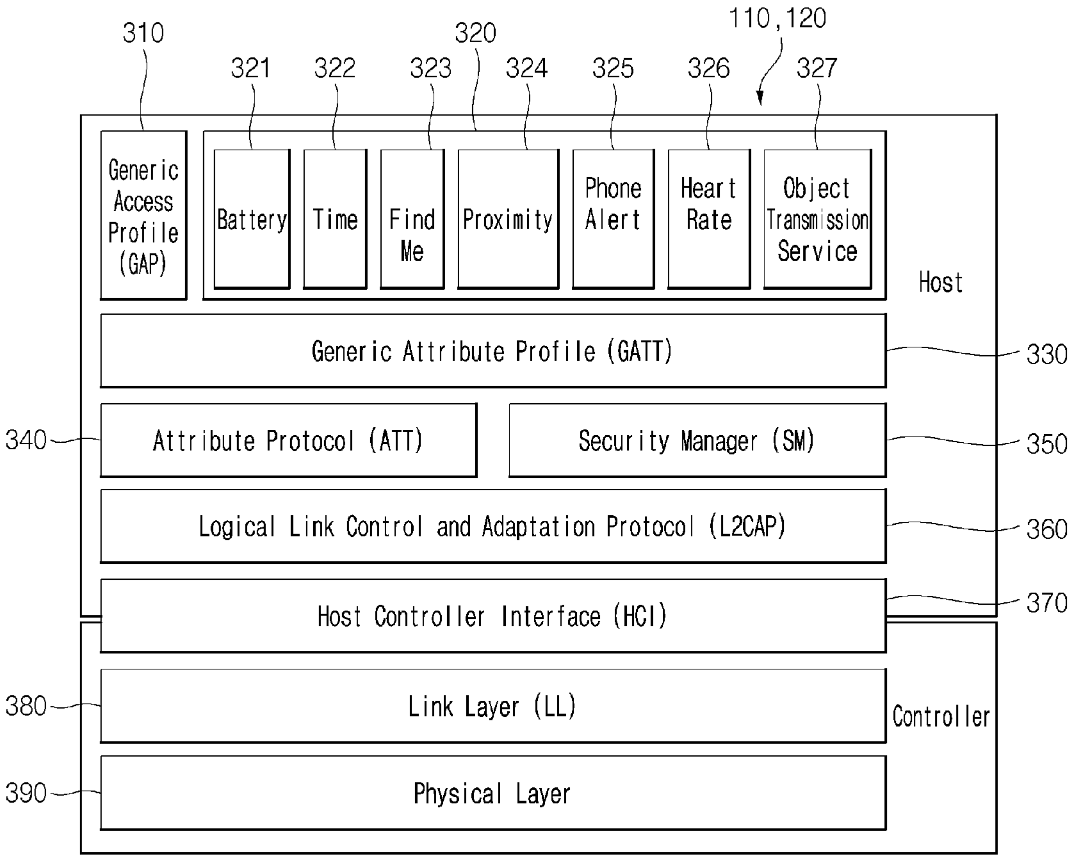
FIG. 3 illustrates an example of a Bluetooth communication architecture to which methods proposed by the present disclosure may be applied.

FIG. 3 illustrates an example of a Bluetooth communication architecture to which methods proposed by the present disclosure may be applied.

Specifically, FIG. 3 illustrates an example of an architecture of Bluetooth low energy (LE).

As shown in FIG. 3, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. The host stack is not limited to the aforementioned composition, but may include various protocols and profiles.

The host stack multiplexes various protocols and profiles provided by that Bluetooth disclosure using the L2CAP.

First, the L2CAP 360 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 350 authenticates a device, which is a protocol for providing a key distribution.

The ATT 340 relies on a server-client structure, which defines rules for a corresponding device for data access. Six message types are defined: Request, Response, Command, Notification, Indication, and Confirmation.

① Request and Response message: the Request message is used when a client device requests specific information from a server device, and the Response message is used in response to a Request message, which is transmitted from the server device to the client device.

② Command message: The Command message is transmitted from a client device to a server device in order to indicate a command for a specific operation, but the server device does not send a response to a Command message to the client device.

③ Notification message: A server device sends this message to a client device in order to provide notification of an event, but the client device does not send a confirmation message to the server device in response to a Notification message.

④ Indication and Confirm message: A server device sends this message to a client device in order to provide notification of an event. Unlike in the Notification message, the client device sends a Confirm message to the server device in response to an Indication message.

The generic access profile (GAP) is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

① Service: A combination of actions related to data, and it defines the basic operation of a device.

② Include: Define a relationship between services.

③ Characteristics: A data value used by a service.

④ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.

Time: A method for exchanging time information.

FindMe: A method for providing an alarm service according to the distance.

Proximity: A method for exchanging battery information.

Time: A method for exchanging time information

The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 390, a link layer 380, and a host controller interface 370.

The physical layer 390 (or a wireless transmission and reception module) sends and receives radio signals of 2.4 GHz, and uses GFSK modulation and frequency hopping utilizing 40 RF channels.

The link layer 380 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption may be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE disclosure, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices may scan the discoverable device through an advertising (or broadcast) physical channel.

Both of the discovering device and the discoverable device may already have been connected to other Bluetooth devices in a piconet.

Connecting Procedure

A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters a connection state when the device performing the connection request, i. E., the initiating device transmits CONNECT_REQ PDU to the advertising device or when the advertising device receives CONNECT_REQ PDU from the initiating device.

After entering the connections state, it is considered that the connection is created. However, it need not be considered so that the connection is established at the time of entering the connections state. An only difference between a newly created connection and the previously established connection is a link layer connection supervision timeout value.

When two devices are connected to each other, two devices play difference roles.

A link layer serving as a master is referred to as the master and a link layer serving as a slave is referred to as the slave. The master controls a timing of a connection event and the connection event refers to a time at which the master and the slave are synchronized.

Hereinafter, a packet defined the Bluetooth interface will be briefly described. BLE devices use packets defined below.

Packet Format

The link layer has only one packet format used for both an advertising channel packet and a data channel packet.

Each packet is constituted by four fields, i.e., a preamble, an access address, a PDU, and a CRC.

When one packet is transmitted in an advertising physical channel, the PDU will become an advertising channel PDU and when one packet is transmitted in a data physical channel, the PDU will become a data channel PDU.

Advertising Channel PDU

The advertising channel PDU includes a 16 bit header and a payload of various sizes.

The PDU type field of an advertising channel included in the header supports PDU types defined in Table 1 below.

TABLE 1

| | | | Permitted PHYs | | |
|---|---|---|---|---|---|
| PDU Type | PDU Name | Channel | LE 1M | LE 2M | LE Coded |
| 0000b | ADV_IND | Primary Advertising | ● | | |
| 0001b | ADV_DIRECT_IND | Primary Advertising | ● | | |
| 0010b | ADV_NONCONN_IND | Primary Advertising | ● | | |
| 0011b | SCAN_REQ | Primary Advertising | ● | | |
| | AUX_SCAN_REQ | Secondary Advertising | ● | ● | ● |
| 0100b | SCAN_RSP | Primary Advertising | ● | | |
| 0101b | CONNECT_IND | Primary Advertising | ● | | |
| | AUX_CONNECT_REQ | Secondary Advertising | ● | ● | ● |
| 0110b | ADV_SCAN_IND | Primary Advertising | ● | | |

Advertising PDU

The following advertising channel PDU types are called advertising PDUs and are used for specific events.

- ADV_IND: a connectable non-directional advertisement event
- ADV_DIREC_IND: a connectable directional advertisement event
- ADV_NONCONN_IND: a non-connectable non-directional advertisement event
- ADV_SCAN_IND: a non-directional advertisement event that may be scanned The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDU

The data channel PDU may have a 16-bit header and various sizes of payloads and include a message integrity check (MIC) field.

The procedure, the state, the packet format, and the like in the BLE technology, which are described above, may be applied in order to perform methods proposed by the present disclosure.

Figure 4:
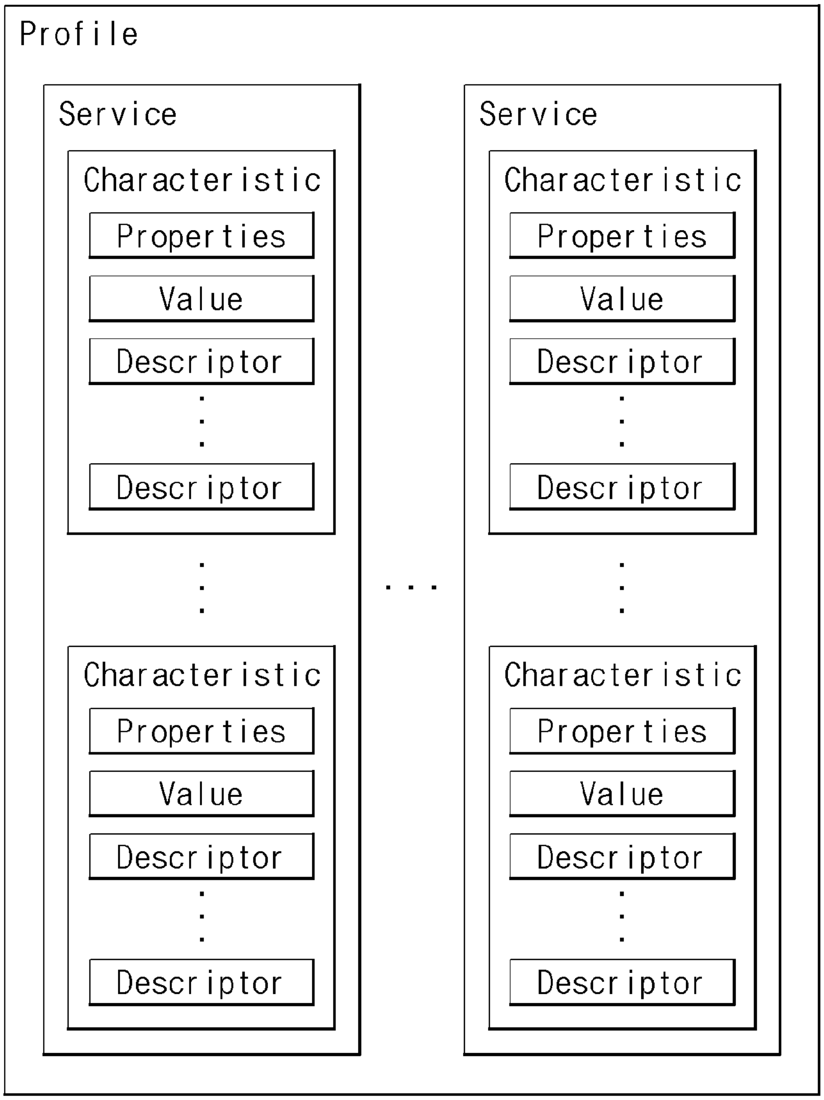
FIG. 4 illustrates an example of a structure of a generic attribute profile (GATT) of Bluetooth low energy.

FIG. 4 illustrates an example of a structure of a generic attribute profile (GATT) of Bluetooth low energy.

Referring to FIG. 4, a structure for exchanging profile data of the Bluetooth low energy may be described.

Specifically, the generic attribute profile (GATT) is a definition of a method in which data is transmitted and received by using services and characteristics between the Bluetooth LE devices.

In general, a Peripheral device (e.g., a sensor device) serves as a GATT server and has a definition of services and characteristics.

A GATT client sends a data request to the GATT server in order to read or write the data and all transactions start at the GATT client and the response is received from the GATT server.

Figure 5:
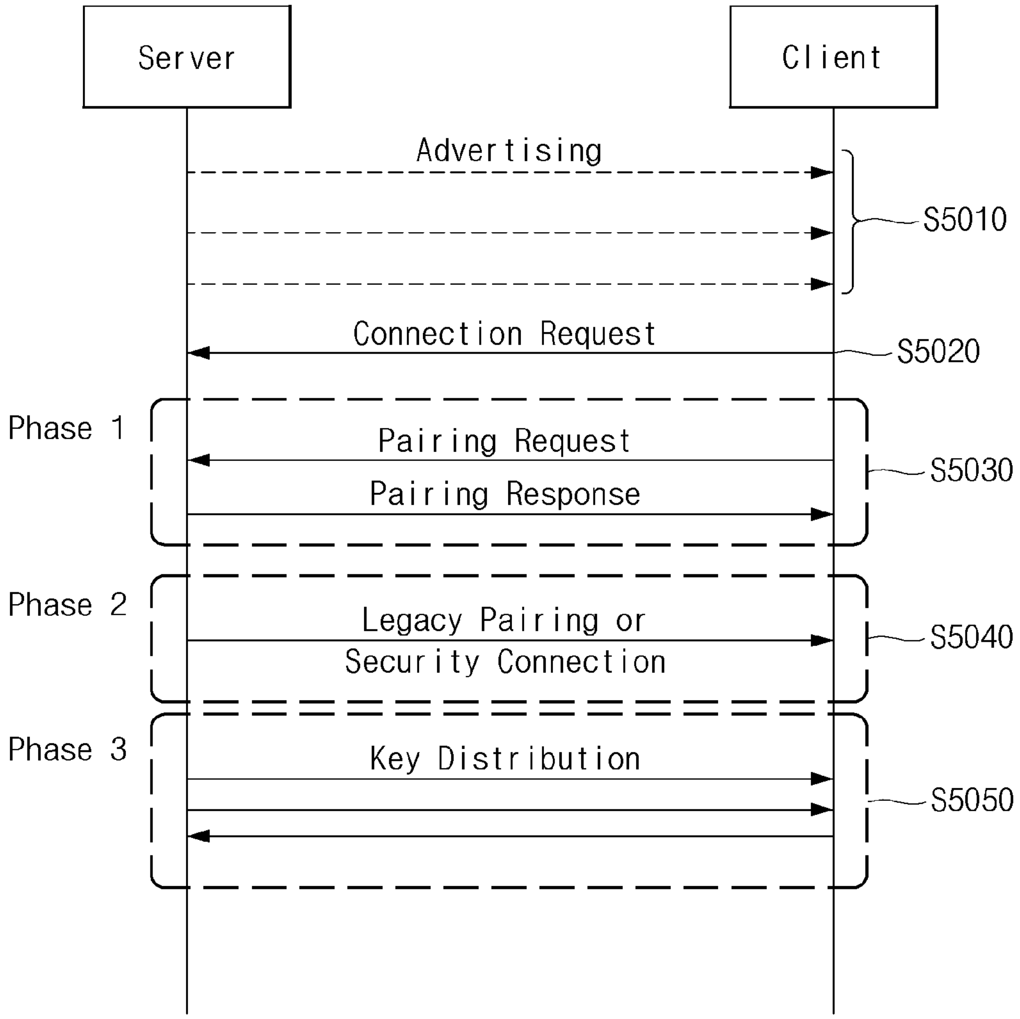
FIG. 5 is a flowchart showing an example of a connection procedure method in Bluetooth low power energy technology to which various embodiments of the present disclosure may be applied.

A GATT-based operation structure used in the Bluetooth LE may be based on THE profile, the service, and the characteristic, and may have a vertical structure illustrated in FIG. 5.

The profile may be constituted by one or more services and the service may be constituted by one or more characteristics or other services.

The service may serve to divide data into logical units and include one or more characteristics or other services. Each service has a 16-bit or 128-bit separator called a Universal Unique Identifier (UUID).

The characteristic is a lowest unit in the GATT-based operation structure. The characteristic includes only one datum and has a 16-bit or 128-bit UUID similar to the service.

The characteristic is defined as a value of various information and requires one attribute to contain each information. The characteristic may adopt various consecutive attributes.

The attribute is constituted by four components, which have the following meanings.

handle: Address of attribute

Type: Type of attribute

Value: Value of attribute

Permission: Access authority to attribute

FIG. 5 is a flowchart showing an example of a connection procedure method in Bluetooth low power energy technology to which the present disclosure may be applied.

A server transmits to a client an advertisement message through three advertising channels (S5010).

The server may be called an advertiser before connection and called as a master after the connection. As an example of the server, there may be a sensor (temperature sensor, etc.).

Further, the server may be called a scanner before the connection and called as a slave after the connection. As an example of the client, there may be a smartphone, etc.

As described above, in Bluetooth, communication is performed over a total of 40 channels through the 2.4 GHz band. Three channels among 40 channels as the advertising channels are used for exchanging sent and received for establishing the connection, which include various The remaining 37 channels are used for data exchange after connection to the data channel.

The client may receive the advertisement message and thereafter, transmit the Scan Request message to the server in order to obtain additional data (e.g., a server device name, etc.).

In this case, the server transmits the Scan Response message including the additional data to the client in response to the Scan Request message.

Here, the Scan Request message and the Scan Response message are one type of advertising packet and the advertising packet may include only user data of 31 bytes or less.

Therefore, when there is data in which the size of the data is larger than 3 bytes, but overhead to transmit the data through the connection, the data is divided and sent twice by using the Scan Request message and the Scan Response message.

Next, the client transmits to the server a Connection Request message for establishing a Bluetooth connection with the server (S5020).

Therefore, a Link Layer (LL) connection is established between the server and the client.

Thereafter, the server and the client perform a security establishment procedure.

The security establishment procedure may be interpreted as security simple pairing or may be performed including the same.

That is, the security establishment procedure may be performed through Phase 1 through Phase 3.

Specifically, a pairing procedure (Phase 1) is performed between the server and the client (S5030).

In the pairing procedure, the client transmits a Pairing Request message to the server and the server transmits a Pairing Response message to the client.

Through the pairing procedure, authentication requirements and input (I)/output (O) capabilities and Key Size information are sent and received between the devices. Through the information, which key generation method is to be used in Phase 2 is determined.

Next, as Phase 2, legacy pairing or secure connections are performed between the server and the client (S5040).

In Phase 2, A 128-bit temporary key and a 128-bit short term key (STK) for performing the legacy pairing are generated.

Temporary Key: Key made for creating the STK

Short Term Key (LTK): Key value used for making encrypted connection between devices When the secure connection is performed in Phase 2, a 128-bit long term key (LTK) is generated.

Long Term Key (LTK): Key value used even in later connection in addition to encrypted connection between the devices Next, as Phase 3, a Key Distribution procedure is performed between the server and the client (S5050).

Therefore, the secure connection may be established and the data may be transmitted and received by forming the encrypted link.

Isochronous Channel General

In the case of an audio signal, it can be seen that audio streaming data or audio data occurs periodically at an idle event interval.

The audio data occurs periodically (or at specific time intervals) according to its characteristics. Here, a specific time period in which audio data periodically occurs may be expressed as the idle event interval. In each Idle Event Interval, each audio data is transported. In addition, each audio data may be transported through all or part of the Idle Event Interval. When transporting audio streaming data occurring periodically or regularly using the BLE mechanism, advertising and scanning procedures, communication procedures, disconnection procedures, etc. must be performed whenever the occurred audio data is transmitted and received. However, audio data generally occurs periodically, and a latency guarantee for audio data transport is essential regardless of the amount of data.

However, when advertising and scanning procedures, communication procedures, disconnection procedures, etc. must be performed whenever newly occurred audio data is transported, there is a problem in that latency occurs in audio data transport.

The transport of audio data through hearing aids (HA) or headsets can obtain higher energy efficiency when using BLE technology than Bluetooth BR/EDR technology because of the relatively small amount of data, however, as seen above, because advertising and connection, etc. must be performed for each data transport, the Data Channel Process of BLE technology has a large overhead in data transport, and in particular, cannot guarantee Latency Guarantee, which is absolutely necessary for audio data transport.

In addition, since the Data Channel Process of BLE technology aims to transport data occurred in a single only when necessary and in other time domains, and since it aims to increase energy efficiency by inducing Deep Sleep of BLE devices, it can be difficult to apply the Data Channel Process of BLE technology to the transport of periodically occurring audio data.

Definition of Isochronous Channels and Related Mechanisms

A new channel, that is, an isochronous channel, is defined to transport data occurring periodically using BLE technology.

The isochronous channel is a channel used to transport isochronous data between devices (e.g. Conductor-Member) using an isochronous stream.

The isochronous data refers to data that is periodically or regularly transported at specific time intervals.

That is, the isochronous channel may represent a channel through which periodically occurring data such as audio data or voice data is transmitted and received in the BLE technology. Also, the isochronous channel may represent a channel through which data generated based on a user input of a controller device of a game user is transmitted and received in a gaming scenario. The isochronous channel may be used to transmit and receive data with a single member, a set of one or more coordinated members, or multiple members. In addition, the isochronous channel corresponds to a flushing channel that can be used to transmit and receive an isochronous stream such as audio streaming or important data in another time domain.

Configuration of Various Embodiments of the Present Disclosure

Motivation for various embodiments of the present disclosure is as follows.

The current core mainly describes multiple connected isochronous streams (CIS) with slow service data unit (SDU) arrivals (10 ms+). For example, the description of an SDU synchronization reference is for synchronization of two CIS channels (low energy (LE) audio left and right). The Transport Latency equation for synchronization may consequently be interpreted as fast intervals not being achieved because packets must be buffered before an ISO interval.

A synchronization reference is a time reference of an SDU that allows synchronization of isochronous data in multiple devices.

There is no clear description of a single CIS with fast SDU arrival (1 ms to 5 ms) that does not require synchronization. The core HCI command (HCI_LE_Set_CIG_Parameters) has an SDU interval of 0xFF to 0xFFFFF us (minimum 255 us) and a MAX Transport latency of 0x05 to 0xFA0 ms.

The packet may be sent within the max transport latency (i.e. the packet may be transported immediately). To this end, the max transport latency of 0x00 may be explicitly added. If the controller is commanded to configure a single CIS with fast SDU_arrival, the best result is to send the SDU as soon as possible without buffering.

FIG. 6 illustrates an example of a parameter for determining a service data unit (SDU) interval and a max transport latency in a wireless communication system according to various embodiments of the present disclosure.

Specifically, FIG. 6 shows an example of a configuration of a Current Core (ver5.3, vol 4, part, 7.8.97 HCI Command).

Referring to FIG. 6, SDU_Interval_C_To_P has a size of 3 octets. When SDU_Interval_C_To_P has a value of 0x0000FF to 0x0FFFFF, it represents the interval of periodic SDUs in units of microseconds. It is reserved for future use for the case where SDU_Interval_C_To_P has other values.

MAX_Transport_Latency_C_To_P has a size of 2 octets. When MAX_Transport_Latency_C_To_P has a value of 0x0005 to 0x0FA0, it represents the maximum transport latency from the central's controller to the peripheral's controller in units of milliseconds. It is reserved for future use for the case where MAX_Transport_Latency_C_To_P has other values.

Figure 7:
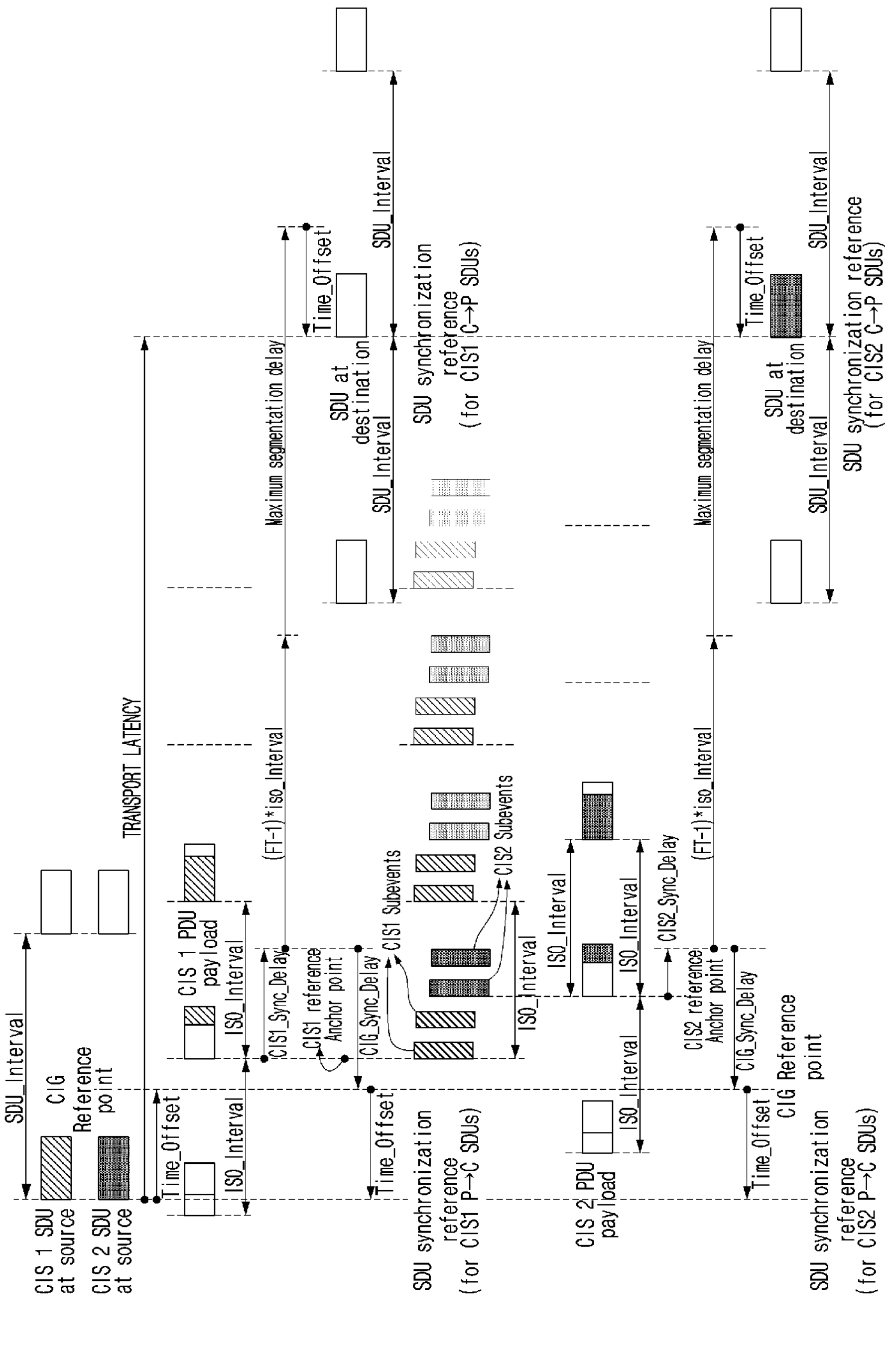
FIG. 7 illustrates an example of an SDU synchronization reference using a time offset parameter in a wireless communication system according to various embodiments of the present disclosure.

FIG. 7 illustrates an example of an SDU synchronization reference using a time offset parameter in a wireless communication system according to various embodiments of the present disclosure.

Specifically, FIG. 7 shows an example of a configuration of a Current Core (ver5.3, vol6, partG 3.2 SDU Synch. reference). FIG. 7 shows an SDU synchronization reference using the time offset parameter.

Referring to FIG. 7, as follows.

Framed:

Transport_Latency_C_To_P=CIG_Sync_Delay+(FT_C_To_p)×ISO_Interval+SDU_Interval_C_To_P Unframed:

Transport_Latency_C_To_P=CIG_Sync_Delay+(FT_C_To_P−1)×ISO_Interval+((ISO_Interval±SDU_Interval_C_To_P)−1)×SDU_Interval_C_To_P The description of the SDU synchronization reference is for synchronization of two CIS channels and SDU arrival is slow (10 ms+).

The synchronization reference is a time reference of the SDU that allows synchronization of isochronous data in multiple devices.

Figure 8:
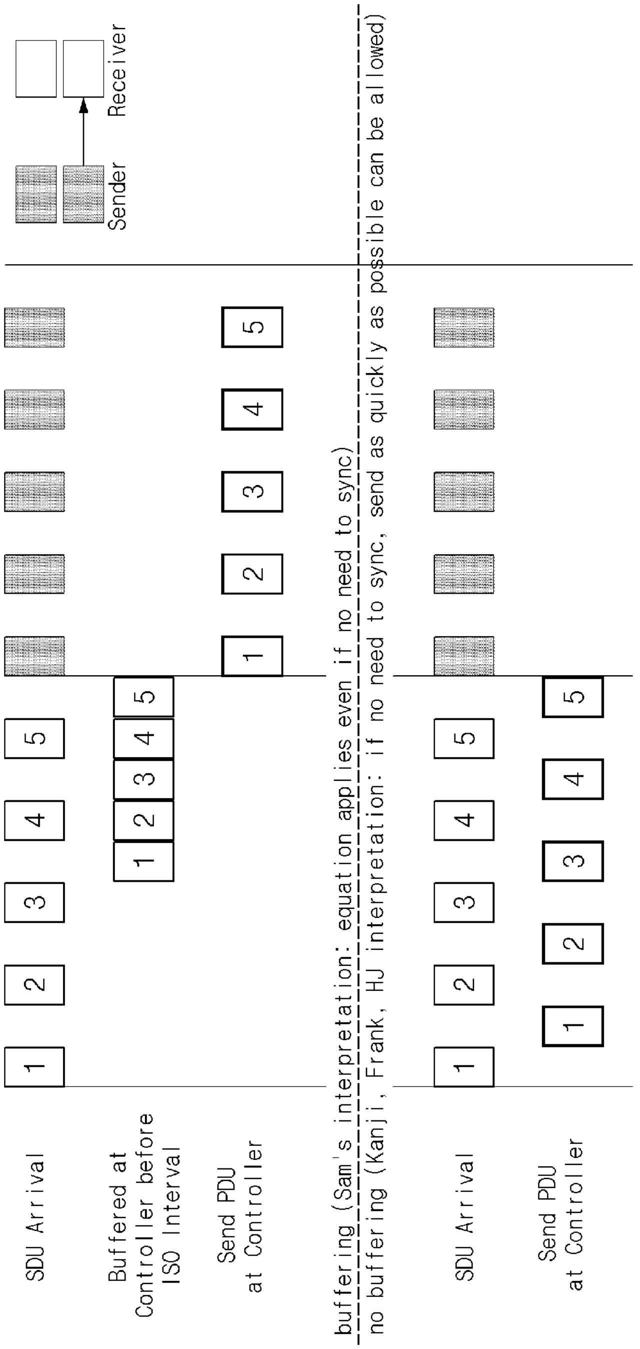
FIG. 8 illustrates an example of 1 ms interval comparison at a transport side for a case where buffering exists and a case where buffering does not exist in a wireless communication system according to various embodiments of the present disclosure.

FIG. 8 illustrates an example of 1 ms interval comparison at a transport side for a case where buffering exists and a case where buffering does not exist in a wireless communication system according to various embodiments of the present disclosure.

Specifically, FIG. 8 shows an example of 1 ms interval comparison on a sending side with respect to buffering and no buffering (BN(burst number)=5, Sub Interval=1 ms, ISO Interval=5 ms, FT(flush timeout)=1).

FIG. 8 is an example of a case in which a PDU comes every 10 ms in the audio-related Bluetooth standard, but the PDU comes every 1 ms, the isochronous streams (ISO) interval is 5 ms, and the sub interval is 1 ms.

Referring to the case where buffering exists at the top of FIG. 8, after SDUs 1, 2, 3, 4, and 5 arrive at the controller of the sending side device, buffering is performed in the controller before the ISO interval, and then the PDU is sent from the controller. If there is buffering, according to Sam's interpretation, the equation is applied even if there is no need to synchronize.

Referring to the case where buffering does not exist at the bottom of FIG. 8, SDUs 1, 2, 3, 4, and 5 each arrive at the controller of the sending device with a subinterval of 1 ms. Immediately after SDU 1 arrives at the controller, PDU 1 is transported from the controller. Immediately after SDU 2 arrives at the controller, PDU 2 is transported from the controller. Immediately after SDU 3 arrives at the controller, PDU 3 is transported from the controller. Immediately after SDU 4 arrives at the controller, PDU 4 is transported from the controller. Immediately after SDU 5 arrives at the controller, PDU 5 is transported from the controller. If there is no buffering, according to the Kanji, Frank, HJ interpretation, it is acceptable to transport as soon as possible if there is no need to synchronize.

Figure 9:
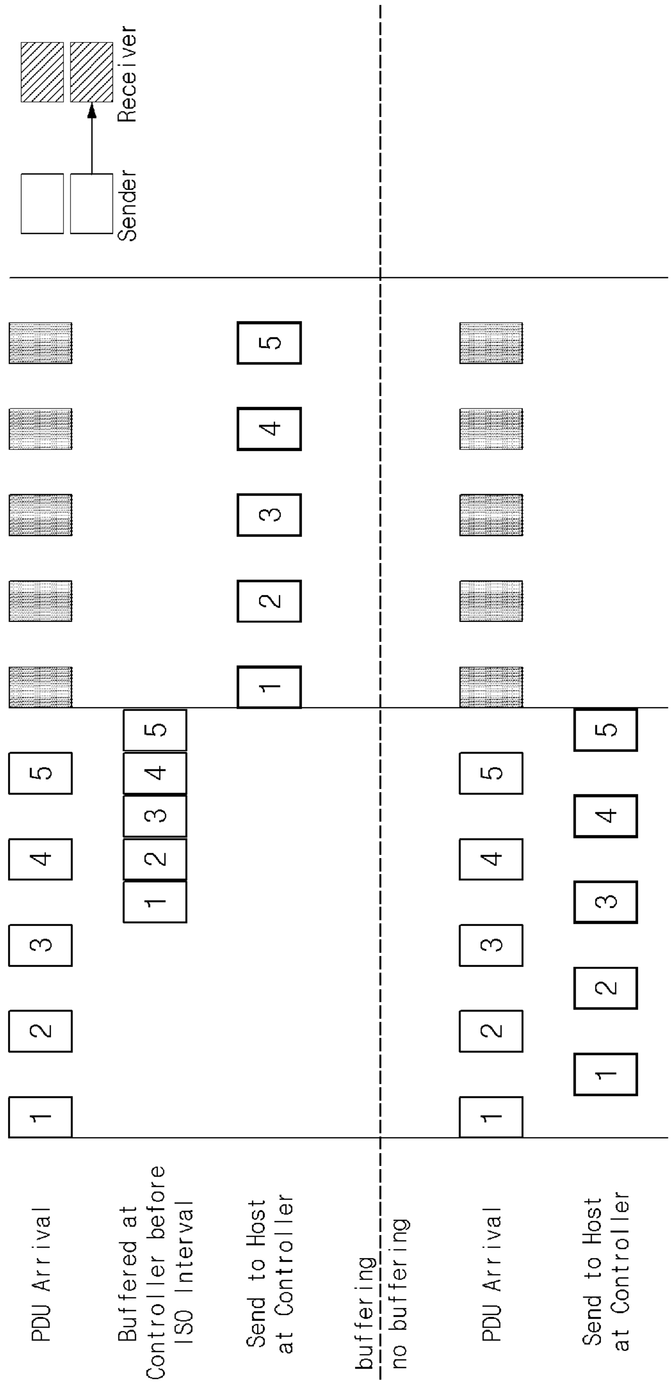
FIG. 9 illustrates an example of 1 ms interval comparison at a receiving side for a case where buffering exists and a case where buffering does not exist in a wireless communication system according to various embodiments of the present disclosure.

FIG. 9 illustrates an example of 1 ms interval comparison at a receiving side for a case where buffering exists and a case where buffering does not exist in a wireless communication system according to various embodiments of the present disclosure.

Specifically, FIG. 9 shows an example of 1 ms interval comparison at the receiving side for buffering and no buffering. (BN(burst number)=5, Sub Interval=1 ms, ISO Interval=5 ms, FT(flush timeout)=1)

Referring to the case where buffering exists at the top of FIG. 9, after PDUs 1, 2, 3, 4, and 5 arrive at the receiving device, buffering is performed in the controller before the ISO interval, and then, the PDU is transported from the controller of the receiving device (hereinafter, the controller is the same as the Controller stack) to the host of the receiving device (hereinafter, the host is the same as the Host stack).

Referring to the case where buffering does not exist at the bottom of FIG. 9, PDUs 1, 2, 3, 4, and 5 each arrive at the receiving device with a subinterval of 1 ms. Immediately after PDU 1 arrives at the receiving device, PDU 1 is transported from the controller of the receiving device to the host of the receiving device. Immediately after PDU 2 arrives at the receiving device, PDU 2 is transported from the controller of the receiving device to the host of the receiving device. Immediately after PDU 3 arrives at the receiving device, PDU 3 is transported from the controller of the receiving device to the host of the receiving device. Immediately after PDU 4 arrives at the receiving device, PDU 4 is transported from the controller of the receiving device to the host of the receiving device. Immediately after PDU 5 arrives at the receiving device, PDU 5 is transported from the controller of the receiving device to the host of the receiving device.

Figure 10:
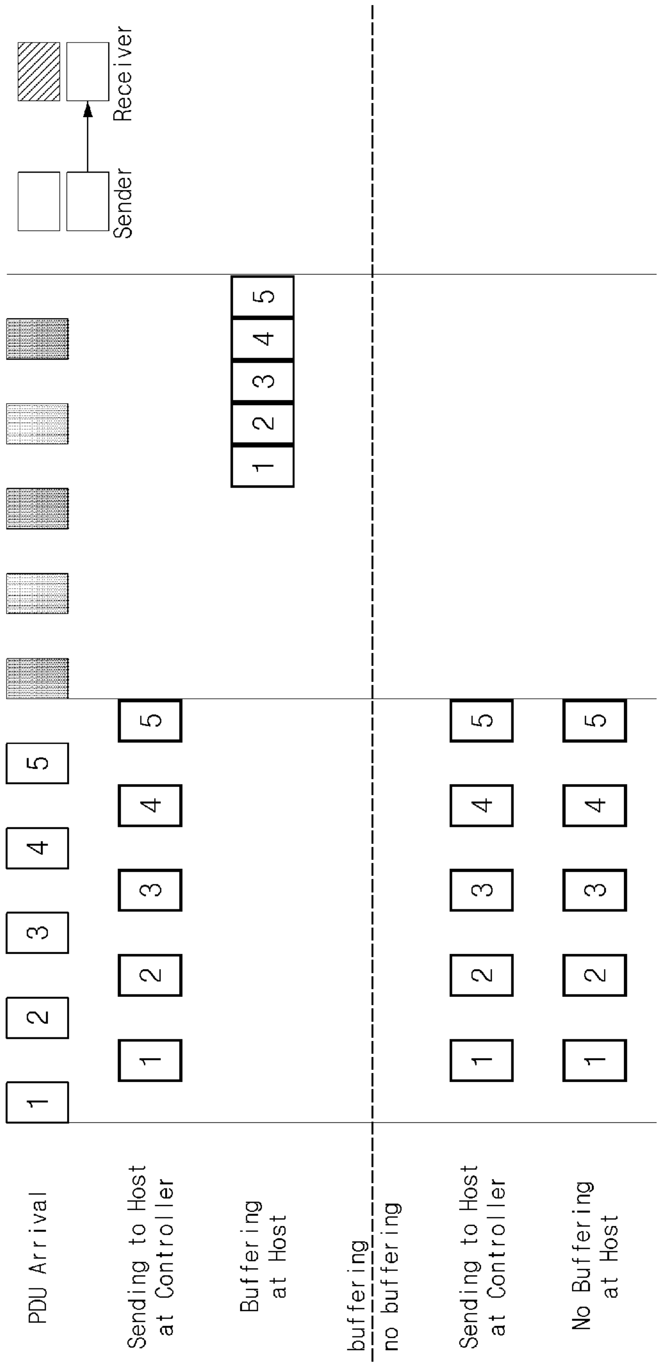
FIG. 10 illustrates an example of 1 ms interval comparison in a receiving host for a case where buffering exists and a case where buffering does not exist in a wireless communication system according to various embodiments of the present disclosure.

FIG. 10 illustrates an example of 1 ms interval comparison in a receiving host for a case where buffering exists and a case where buffering does not exist in a wireless communication system according to various embodiments of the present disclosure.

Even if the controller of the receiving device immediately transports a PDU to the host of the receiving device, buffering may occur in the host of the receiving device to meet a synchronization reference point. On the other hand, in the case of a single CIS, there is no need to wait until the synchronization reference point.

Referring to the case where buffering does not exist in the controller of the receiving device and buffering exists in the host of the receiving device at the top of FIG. PDUs 1, 2, 3, 4, and 5 each arrive at the receiving device with a subinterval of 1 ms. Immediately after PDU 1 arrives at the receiving device, PDU 1 is transported from the controller of the receiving device to the host of the receiving device. Immediately after PDU 2 arrives at the receiving device, PDU 2 is transported from the controller of the receiving device to the host of the receiving device. Immediately after PDU 3 arrives at the receiving device, PDU 3 is transported from the controller of the receiving device to the host of the receiving device. Immediately after PDU 4 arrives at the receiving device, PDU 4 is transported from the controller of the receiving device to the host of the receiving device. Immediately after PDU 5 arrives at the receiving device, PDU 5 is transported from the controller of the receiving device to the host of the receiving device. Buffering is performed for PDUs 1, 2, 3, 4, and 5 in the host of the receiving device.

Referring to the case where buffering does not exist in the controller of the receiving device and buffering does not exist in the host of the receiving device at the bottom of FIG. 10, PDUs 1, 2, 3, 4, and 5 are transported from the controller of the receiving device to the host of the receiving device and processed in the host of the receiving device at the same time.

FIG. 11 illustrates an example of a parameter for determining a max transport latency in a wireless communication system according to various embodiments of the present disclosure.

Specifically, FIG. 11 shows an example of a parameter for applying No Buffering mode in which buffering does not exist.

In the case of one CIS with an SDU interval of 1 ms to 5 ms, the SDU must be transported as soon as possible. No latency equation needed.

According to an embodiment for applying the No Buffering mode, Max_Transport_Latency may be configured to 0x00 (a reserved value). This means that SDUs should be transported as soon as possible without buffering. Referring to FIG. 11, Max_Transport_Latency_C_To_P has a size of 2 octets. When Max_Transport_Latency_C_To_P has a value of 0x0005 to 0x0FA0, it represents the maximum transport latency from the central's controller to the peripheral's controller in units of milliseconds. It is reserved for future use for the case where MAX_Transport_Latency_C_To_P has other values.

According to an embodiment for applying the No Buffering mode, a No buffering feature bit may be added in a Feature set.

According to an embodiment for applying the No Buffering mode, an Equal Sub interval spacing bit may be added to HCI_LE_Set_CIG_Parameters.

According to an embodiment for applying the No Buffering mode, link parameters (ISO interval, NSE(number of subevents), BN(burst number), FT(flush timeout), sub interval) may be configured using the Test HCI command.

A case in which an asynchronous connectionless link (ACL) and isochronous streams (ISO) collide will be described.

When the ACL and the ISO can collide in 1 ms sub interval scheduling, the current core specification allows ISO timing to be used for ACL transport in the center.

Even in a 1 ms sub interval, the ACL and the ISO do not collide with packet length restrictions.

When sub intervals are not perfectly equal intervals, the ACL and the ISO may be clearly configured not to collide.

If sub interval scheduling is greater than 1 ms, the ACL and the ISO do not collide.

After the ISO data channel is established, ACL traffic is very rare compared to ISO traffic.

In order to keep the timing heartbeat for ISO alive (empty packet), etc. in the control plane, the following operations can be performed: update connection(11 byte), update channel map(7 byte), update connection parameters(23 byte)

In a data plane, in order to transport reliable data, it may operate in a longer interval than ISO. For reliable data, ISO retransmission (NSE, BN, FT) or forward error correction (FEC) is good.

Figure 12:
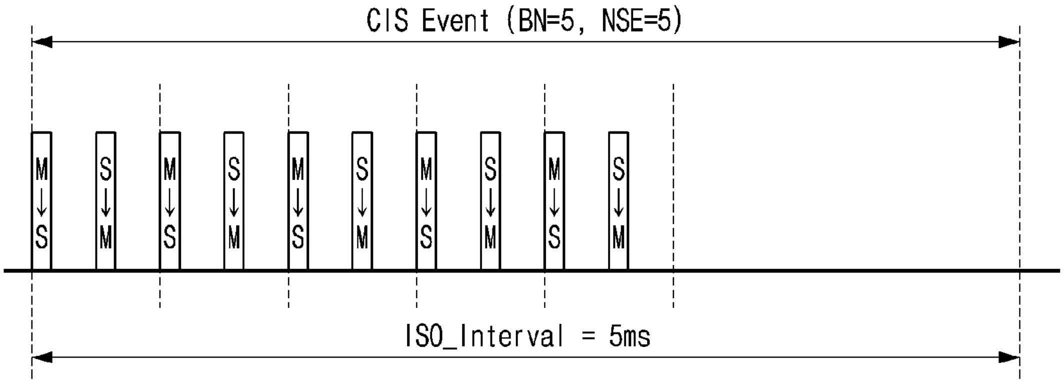
FIG. 12 illustrates an example of a packet transport interval in a case where buffering exists in a wireless communication system according to various embodiments of the present disclosure.

FIG. 12 illustrates an example of a packet transport interval in a case where buffering exists in a wireless communication system according to various embodiments of the present disclosure.

Referring to FIG. 12, a Connected Isochronous Stream (CIS) event performed by transport of a packet between a master device (M) and a slave device (S) is illustrated.

In a Connected Isochronous Stream (CIS) event in an environment configured to (BN=5, NSE=5, ISO_interval=5 ms), when the sub interval is not controlled, non equal spacing exists in packet transport.

When events occur back and forth, there is a problem in that jitter occurs between events.

Figure 13:
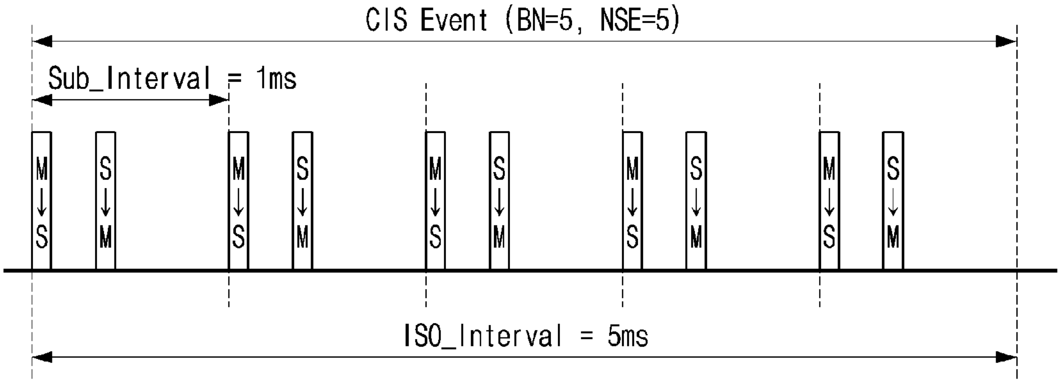
FIG. 13 illustrates an example of a packet transport interval in a case where buffering does not exist in a wireless communication system according to various embodiments of the present disclosure.

FIG. 13 illustrates an example of a packet transport interval in a case where buffering does not exist in a wireless communication system according to various embodiments of the present disclosure.

Referring to FIG. 12, a Connected Isochronous Stream (CIS) event performed by transport of a packet between a master device (M) and a slave device (S) is shown.

In a Connected Isochronous Stream (CIS) event in an environment configured to (BN=5, NSE=5, ISO_interval=5 ms), when the sub interval is controlled, equal spacing exists in packet transport. The empty space after the event can be used for other traffic.

Figure 14:
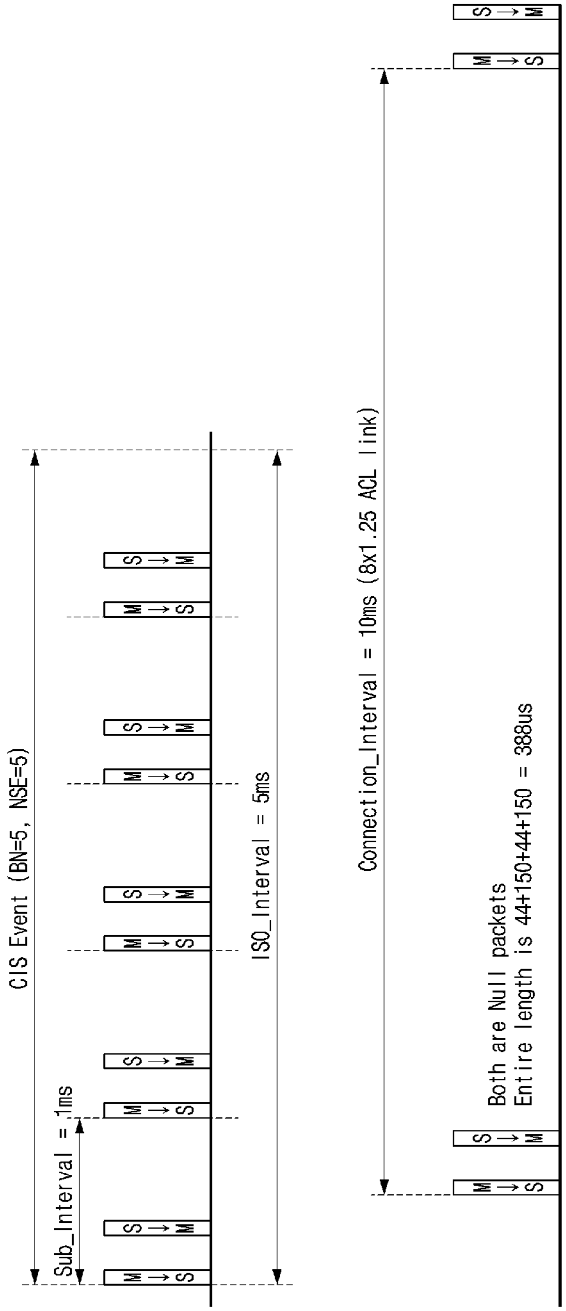
FIG. 14 illustrates an example of a packet transport interval in a case where buffering does not exist in a wireless communication system according to various embodiments of the present disclosure.

FIG. 14 illustrates an example of a packet transport interval in a case where buffering does not exist in a wireless communication system according to various embodiments of the present disclosure.

Specifically, FIG. 14 shows transport of an ISO packet in an environment configured to 1 ms Sub Interval Timing (2M PHY). 1 ms Sub_Interval Timing represents a time interval between subevents in an isochronous event. This means a time between transports of each packet in an isochronous stream, and 1 millisecond in this case. 2M PHY represents a physical layer of a Bluetooth connection operating at a data rate of 2 megabits per second. PHY represents a physical layer, which is the lowest layer of the OSI model (Open Systems Interconnection model) in charge of actual data transport. Therefore, 1 ms Sub Interval Timing (2M PHY) means an isochronous packet transmission setting in which a packet is transported every 1 millisecond in a Bluetooth connection using 2M PHY. That is, it is a data rate of 2 Mega bits per second.

The timing and structure of a Bluetooth Low Energy (BLE) packet exchange may be exemplarily subdivided for a Human Interface Device (HID) such as a mouse.

Packet=Preamble(2 byte)+Access Address(4 byte)+PDU+MIC(4 byte)+CRC(3 byte)

PDU=Header(2 byte)+Payload(0-251)byte

Header=LLID,NESN,SN,CIE,RFU,NPI,RFU+Len(1 byte)

Overhead to Payload(HID Report) is 15 byte(120 bit, 60 us)

C to P: Null packet (Poll), Packet time=11 byte(88 bit, 44 us)

P to C: Payload (Mouse)=4 byte, Packet time=4 byte(32 bit, 16 us)+60 us=76 us

Minimum SE_Length=(M to S)+T_IFS+(S to M)+T_MSS=44+150+76+150=420 us 8 byte: 436 us 10 byte: 444 us 20 byte: 484 us 30 byte: 524 us Each packet contains a preamble, access address, protocol data unit (PDU), message integrity code (MIC), and cyclic redundancy check (CRC). The PDU is further divided into a header and a payload.

The overhead for each payload (HID report) is 15 bytes, which corresponds to 120 bits or 60 microseconds in transport time.

For a specific packet exchange according to the above structure:

The controller C sends a "Null" packet (also referred to as a "poll" packet) to a peripheral device P. This packet occupies 11 bytes (or 88 bits) and takes 44 microseconds to transport.

The peripheral device P sends a payload (e.g. mouse report) back to the controller C. This payload is 4 bytes (or 32 bits) and takes 16 microseconds to transport. Adding an overhead of 60 microseconds, the total transport time of this packet is 76 microseconds.

The calculation of Minimum SE_Length summarizes the various intervals associated with this packet exchange.

(M to S): Time taken for the master (master device or central device) to send a packet to the slave (slave device or peripheral device) (44 microseconds)

T_IFS: space between frames, mandatory pause between packets (150 microseconds)

(S to M): Time taken for the slave to send packets back to the master (76 microseconds)

T_MSS: Transition from master to slave, mandatory pause before master transports again (150 microseconds)

Adding them together gives a total of 420 microseconds for this packet exchange. This is the minimum time interval that must be allotted for a single packet exchange between the controller and the peripheral.

Referring to FIG. 14, when CIS events within the ISO interval are controlled in the same sub interval as in the embodiment of FIG. 13, it appears that there is no collision between ISO and ACL.

In FIG. 14, for ISO transport, in case of CIS event (BN=5, NSE=5, ISO_Interval=5 ms), it is controlled at the same interval of Sub Interval=1 ms. Accordingly, an empty space may be created after the Master to Slave packet transport event and the Slave to Master packet transport event. If the ACL transport is performed in such an empty space, a collision between ISO and ACL may not occur.

FIG. 14, for asynchronous connectionless link (ACL) transport, Connection_Interval=10 ms (8×1.25 ACL link), indicates that the master device and the slave device communicate every 10 ms on the ACL link. Both (M to S transport) and (S to M transport) are null packets. Their total length is 44+150+44+150=388 us. Specifically, the master (M) sends a null packet to the slave (S). This takes 44 microseconds for transport, and 150 microseconds for the inter-frame space (T_IFS), which is a mandatory pause between packets. The slave (S) sends the null packet back to the master (M). This also takes 44 microseconds for the transport and 150 microseconds for the master to slave transition (T_MSS), a mandatory pause before the master transports again. Adding these timings, the total time for this exchange is 388 microseconds. However, the connection interval is 10 milliseconds (or 10,000 microseconds). So, even though the actual packet exchange only takes 388 microseconds, the device initiates a new connection event every 10 ms. During the remaining time, the device may enter a low-power sleep mode, which is one of the reasons why BLE is so power-efficient.

Figure 15:
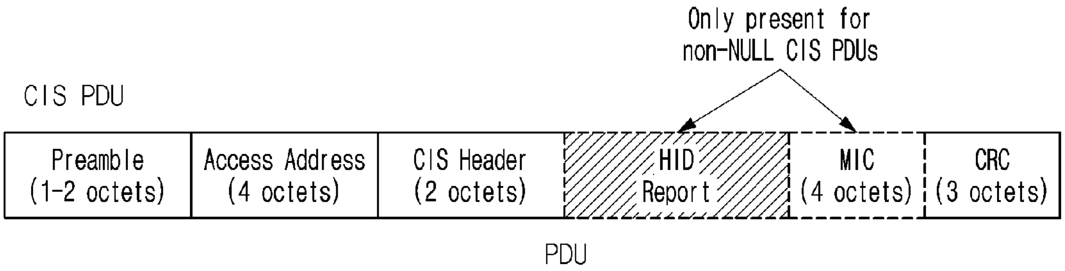
FIG. 15 illustrates an example of a protocol data unit (PDU) structure for a case in which buffering does not exist in a wireless communication system according to various embodiments of the present disclosure.

FIG. 15 illustrates an example of a protocol data unit (PDU) structure for a case in which buffering does not exist in a wireless communication system according to various embodiments of the present disclosure.

FIG. 15 shows an example of a structure for a connected isochronous stream packet data unit (CIS PDU) to prevent collision between ISO transport and ACL transport.

Referring to FIG. 15, the CIS PDU includes a preamble (1 to 2 octets), access address (4 octets), CIS header (2 octets), HID report, MIC (4 octets), and CRC (3 octets). Among them, the HID report and MIC exist only in the case of non-NULL CIS PDUs.

The CIS PDU includes several elements essential for Bluetooth Low Energy (BLE) communication. These PDUs are designed to transport time-sensitive continuous data such as audio streams or Human Interface Device (HID) reports.

preamble (1 to 2 octets): This is a 1-2 octet sequence used by the receiving device to synchronize the receiving device with the received data.

access address (4 octets): 4 octet field used to identify a connection. This is used to verify that an address of packets coming from the receiving device has been specified.

CIS header (2 octets): This is a 2-octet field including various control information for the packet.

HID report: This field contains the actual data being transported (e.g. mouse movement or button press). It exists only in CIS PDUs that is not NULL.

Message Integrity Check (MIC) (4 octets): This 4 octet field is used to verify that received data has not been modified during transport. Also, it exists only in CIS PDUs that is not NULL.

Cyclic Redundancy Check (CRC) (3 octets): This 3 octet field is used to check for errors in received data.

Effects of Various Embodiments of the Present Disclosure

Expected effects of various embodiments of the present disclosure are as follows.

(1) The present disclosure eliminates buffering for packets before ISO intervals in multiple Connected Isochronous Streams (CISs) where a service data unit (SDU) arrivals are slow (10 ms+), for example, in synchronization for two CIS channels (low energy (LE) audio left and right), resulting in fast intervals.

(2) The present disclosure may send a packet within the maximum transport latency (i.e. packets may be transported immediately). To this end, a maximum transport latency of 0x00 may be explicitly added. If the controller is commanded to configure a single CIS with fast SDU_arrival, the best result is to send the SDU as soon as possible without buffering.

[Description Related to Central Device Claim]

Hereinafter, the above-described embodiments will be described in detail with reference to FIG. 16 in terms of operation of a terminal. The methods described below are only classified for convenience of explanation, and it goes without saying that some configurations of one method may be substituted with some configurations of another method or may be combined and applied to each other, unless mutually excluded.

Figure 16:
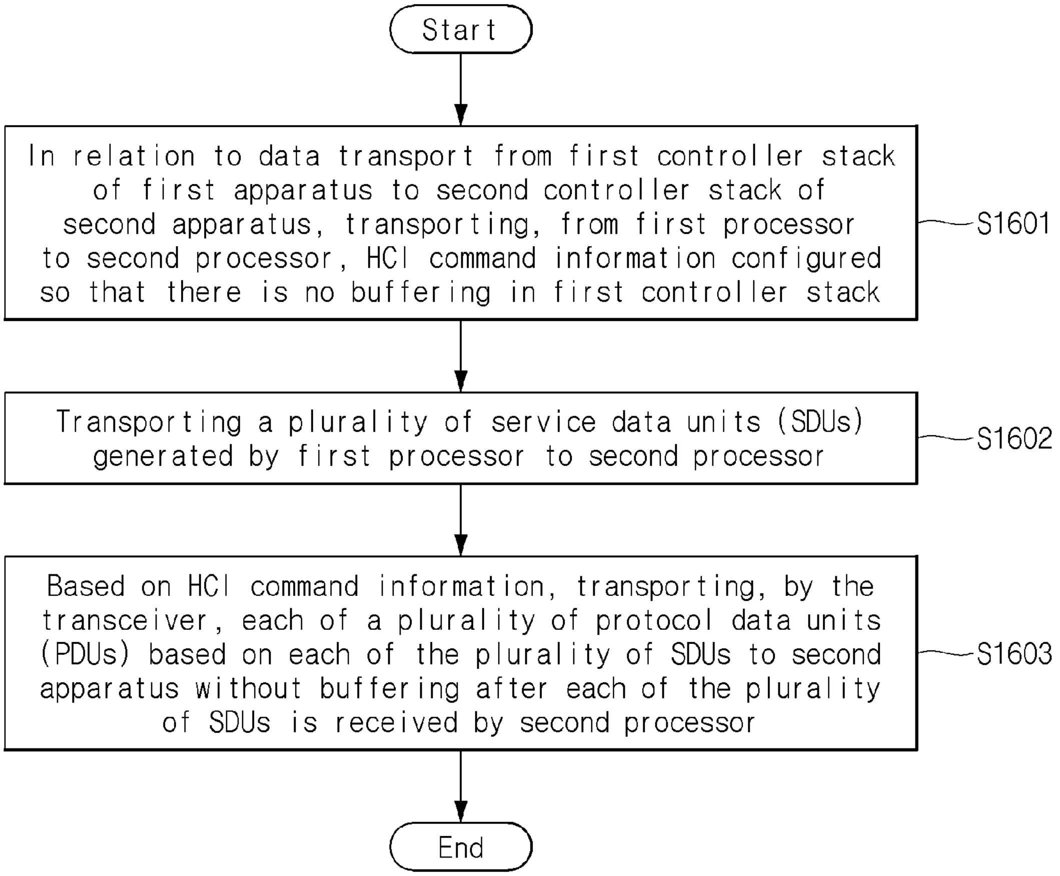
FIG. 16 illustrates an example of an operation process of a wireless apparatus in a short-range wireless communication system according to various embodiments of the present disclosure.

FIG. 16 illustrates an example of an operation process of a wireless apparatus in a short-range wireless communication system according to various embodiments of the present disclosure.

According to various embodiments of the present disclosure, a method performed by a wireless apparatus (i.e. a first apparatus) in a short-range wireless communication system is provided.

The first apparatus includes a first processor corresponding to a host stack; a second processor corresponding to a first controller stack; a memory; and a transceiver. The host stack and the first controller stack are connected through a host controller interface (HCI).

In step S1601, The first apparatus, in relation to data transport from the first controller stack of the first apparatus to a second controller stack of a second apparatus, transports, from the first processor to the second processor, HCI command information configured so that there is no buffering in the first controller stack.

In step S1602, The first apparatus transports a plurality of service data units (SDUs) generated by the first processor to the second processor. Each of the plurality of SDUs is transported to the second processor apart at each configured sub interval.

In step S1603, The first apparatus, based on the HCI command information, transports, by the transceiver, each of a plurality of protocol data units (PDUs) based on each of the plurality of SDUs to the second apparatus without buffering after each of the plurality of SDUs is received by the second processor. The transport of the plurality of PDUs is performed within one isochronous event.

According to various embodiments of the present disclosure, in order to have no buffering in the first controller stack, a parameter related to a max transport latency in the HCI command information may be configured to a specific value. The parameter related to the max transport latency may be related to buffering in the first controller stack of the plurality of SDUs before an isochronous streams (ISO) interval.

According to various embodiments of the present disclosure, in order to have no buffering in the first controller stack, feature set information in the HCI command information may be configured to include No buffering feature bit. The No buffering feature bit may be related to buffering in the first controller stack of the plurality of SDUs before an isochronous streams (ISO) interval.

According to various embodiments of the present disclosure, in order to have no buffering in the first controller stack, HCI_LE_Set_CIG_Parameters information in the HCI command information may be configured to include an equal sub interval spacing bit. The equal sub interval spacing bit may be related to buffering in the first controller stack of the plurality of SDUs before an isochronous streams (ISO) interval.

According to various embodiments of the present disclosure, in order to have no buffering in the first controller stack, a parameter related to a sub interval in the HCI command information may be configured to a specific value. The parameter related to the sub interval may define an interval between successive sub events within one isochronous event. The parameter related to the sub interval may be related to buffering in the first controller stack of the plurality of SDUs before an isochronous streams (ISO) interval.

According to various embodiments of the present disclosure, each of the plurality of PDUs may be transported to the second apparatus within the sub interval after receiving each of the plurality of SDUs.

According to various embodiments of the present disclosure, a wireless apparatus is provided in a short-range wireless communication system. The wireless apparatus includes a first processor corresponding to a host stack; a second processor corresponding to a first controller stack; a memory; and a transceiver. The host stack and the first controller stack are connected through a host controller interface (HCI). The memory may be configured to store instructions for performing the operating method of the first apparatus according to FIG. 16 based on being executed by the first processor and the second processor.

According to various embodiments of the present disclosure, a control device for controlling a wireless apparatus in a short-range wireless communication system is provided. The control device includes at least one processor and at least one memory operatively connected to the at least one processor. The at least one memory may be configured to store instructions for performing the operating method of the first apparatus according to FIG. 16 based on being executed by the at least one processor.

According to various embodiments of the present disclosure, one or more non-transitory computer readable mediums (CRMs) storing one or more instructions are provided. The one or more instructions may perform operations based on being executed by one or more processors, and the operations may include the method of operating the first apparatus according to FIG. 16.

[Description Related to Peripheral Device Claims]

Hereinafter, the above-described embodiments will be described in detail with reference to FIG. 17 in terms of operation of a terminal. The methods described below are only classified for convenience of explanation, and it goes without saying that some configurations of one method may be substituted with some configurations of another method or may be combined and applied to each other, unless mutually excluded.

Figure 17:
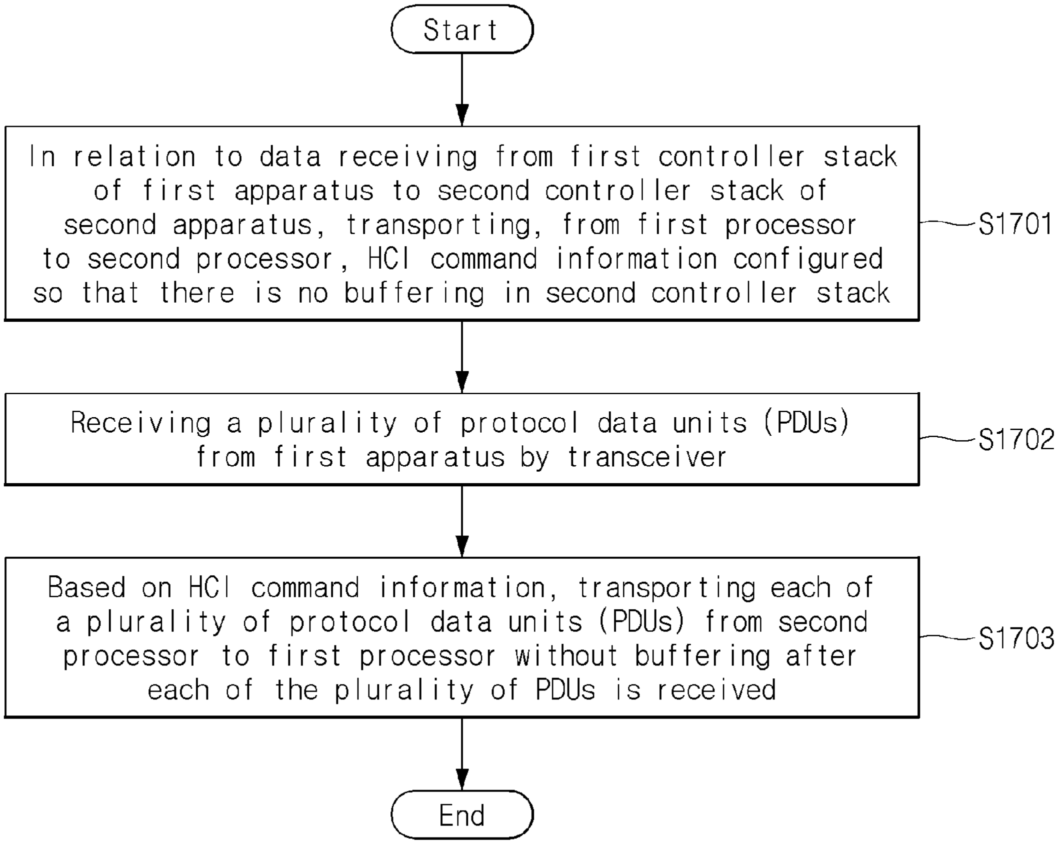
FIG. 17 illustrates an example of an operation process of a wireless apparatus in a short-range wireless communication system according to various embodiments of the present disclosure.

FIG. 17 illustrates an example of an operation process of a wireless apparatus in a short-range wireless communication system according to various embodiments of the present disclosure.

According to various embodiments of the present disclosure, a method performed by a wireless apparatus (i.e. a second apparatus) in a short-range wireless communication system is provided.

The second apparatus includes a first processor corresponding to a host stack; a second processor corresponding to a second controller stack; a memory; and a transceiver. The host stack and the second controller stack are connected through a host controller interface (HCI).

In step S1701, The second apparatus, in relation to data receiving from the first controller stack of the first apparatus to the second controller stack of the second apparatus, transports, from the first processor to the second processor, HCI command information configured so that there is no buffering in the second controller stack.

In step S1702, The second apparatus receives a plurality of protocol data units (PDUs) from the first apparatus by the transceiver. Each of the plurality of PDUs is received apart at each configured sub interval. Reception of the plurality of PDUs is performed within one isochronous event.

In step S1703, The second apparatus, based on the HCI command information, transports each of a plurality of protocol data units (PDUs) from the second processor to the first processor without buffering after each of the plurality of PDUs is received.

According to various embodiments of the present disclosure, in order to have no buffering in the second controller stack, a parameter related to a max transport latency in the HCI command information may be configured to a specific value. The parameter related to the max transport latency may be related to buffering in the second controller stack of the plurality of SDUs before an isochronous streams (ISO) interval.

According to various embodiments of the present disclosure, in order to have no buffering in the second controller stack, feature set information in the HCI command information may be configured to include No buffering feature bit. The No buffering feature bit may be related to buffering in the second controller stack of the plurality of PDUs before an isochronous streams (ISO) interval.

According to various embodiments of the present disclosure, in order to have no buffering in the second controller stack, HCI_LE_Set_CIG_Parameters information in the HCI command information may be configured to include an equal sub interval spacing bit. The equal sub interval spacing bit may be related to buffering in the second controller stack of the plurality of PDUs before an isochronous streams (ISO) interval.

According to various embodiments of the present disclosure, in order to have no buffering in the second controller stack, a parameter related to a sub interval in the HCI command information may be configured to a specific value. The parameter related to the sub interval may define an interval between successive sub events within one isochronous event. The parameter related to the sub interval may be related to buffering in the first controller stack of the plurality of PDUs before an isochronous streams (ISO) interval.

According to various embodiments of the present disclosure, each of the plurality of PDUs may be transported from the second processor to the first processor within the sub interval after receiving each of the plurality of PDUs.

According to various embodiments of the present disclosure, each of the plurality of PDUs may be transported from the second processor to the first processor immediately after receiving each of the plurality of PDUs.

According to various embodiments of the present disclosure, a wireless apparatus is provided in a short-range wireless communication system. The wireless apparatus includes a first processor corresponding to a host stack; a second processor corresponding to a second controller stack; a memory; and a transceiver. The host stack and the second controller stack are connected through a host controller interface (HCI). The memory may be configured to store instructions for performing the operating method of the second apparatus according to FIG. 17 based on being executed by the first processor and the second processor.

According to various embodiments of the present disclosure, a control device for controlling a wireless apparatus in a short-range wireless communication system is provided. The control device includes at least one processor and at least one memory operatively connected to the at least one processor. The at least one memory may be configured to store instructions for performing the operating method of the second apparatus according to FIG. 17 based on being executed by the at least one processor.

According to various embodiments of the present disclosure, one or more non-transitory computer readable mediums (CRMs) storing one or more instructions are provided. The one or more instructions may perform operations based on being executed by one or more processors, and the operations may include the method of operating the second apparatus according to FIG. 17.

Claims described in the present disclosure can be combined in a various way. For instance, technical features in method claims of the present disclosure can be combined to be implemented as an apparatus, and technical features in apparatus claims can be combined to be implemented as a method. Further, technical features in method claim and apparatus claim can be combined to be implemented as an apparatus. Further, technical features in method claim and apparatus claim can be combined to be implemented as a method.

What is claimed is:

1. A method of operating a first apparatus in a short-range wireless communication system, the first apparatus includes: a first processor corresponding to a host stack; a second processor corresponding to a first controller stack; a memory; and a transceiver, wherein the host stack and the first controller stack are connected through a host controller interface (HCI), the method comprising:

in relation to data transport from the first controller stack of the first apparatus to a second controller stack of a second apparatus, transporting, from the first processor to the second processor, HCI command information configured so that there is no buffering in the first controller stack;

transporting a plurality of service data units (SDUs) generated by the first processor to the second processor—each of the plurality of SDUs is transported to the second processor apart at each configured sub interval—; and based on the HCI command information, transporting, by the transceiver, each of a plurality of protocol data units (PDUs) based on each of the plurality of SDUs to the second apparatus without buffering after each of the plurality of SDUs is received by the second processor, wherein transport of the plurality of PDUs is performed within one isochronous event, wherein the HCI command information includes feature set information including a No buffering feature bit, and wherein buffering of the plurality of SDUs in the first controller stack before an isochronous streams (ISO) interval is disabled based on the No buffering feature bit.

2. The method of claim 1, wherein in order to have no buffering in the first controller stack, a parameter related to a max transport latency in the HCI command information is configured to a specific value, and the parameter related to the max transport latency is related to buffering in the first controller stack of the plurality of SDUs before an isochronous streams (ISO) interval.

3. The method of claim 1, wherein in order to have no buffering in the first controller stack, HCI_LE_Set_CIG_Parameters information in the HCI command information is configured to include an equal sub interval spacing bit, and the equal sub interval spacing bit is related to buffering in the first controller stack of the plurality of SDUs before an isochronous streams (ISO) interval.

4. The method of claim 1, wherein in order to have no buffering in the first controller stack, a parameter related to a sub interval in the HCI command information is configured to a specific value, the parameter related to the sub interval defines an interval between successive sub events within one isochronous event, and the parameter related to the sub interval is related to buffering in the first controller stack of the plurality of SDUs before an isochronous streams (ISO) interval.

5. The method of claim 1, wherein each of the plurality of PDUs is transported to the second apparatus within the sub interval after receiving each of the plurality of SDUs.

6. The method of claim 5, wherein each of the plurality of PDUs is transported from the second processor to the first processor immediately after receiving each of the plurality of PDUs.

7. A method of operating a second apparatus in a short-range wireless communication system, the second apparatus includes: a first processor corresponding to a host stack; a second processor corresponding to a second controller stack; a memory; and a transceiver, wherein the host stack and the second controller stack are connected through a host controller interface (HCI), the method comprising:

in relation to data reception from a first controller stack of a first apparatus to the second controller stack of the second apparatus, transporting, from the first processor to the second processor, HCI command information configured so that there is no buffering in the second controller stack;

receiving a plurality of protocol data units (PDUs) from the first apparatus by the transceiver—each of the plurality of PDUs is received apart at each configured sub interval—; and based on the HCI command information, transporting each of the plurality of PDUs from the second processor to the first processor without buffering after receiving each of the plurality of PDUs, wherein reception of the plurality of PDUs is performed within one isochronous event, wherein the HCI command information includes feature set information including a No buffering feature bit, and wherein buffering of the plurality of SDUs in the first controller stack before an isochronous streams (ISO) interval is disabled based on the No buffering feature bit.

8. The method of claim 7, wherein in order to have no buffering in the second controller stack, a parameter related to a max transport latency in the HCI command information is configured to a specific value, and the parameter related to the max transport latency is related to buffering in the second controller stack of the plurality of SDUs before an isochronous streams (ISO) interval.

9. The method of claim 7, wherein in order to have no buffering in the second controller stack, HCI_LE_Set_CIG_Parameters information in the HCI command information is configured to include an equal sub interval spacing bit, and the equal sub interval spacing bit is related to buffering in the second controller stack of the plurality of PDUs before an isochronous streams (ISO) interval.

10. The method of claim 7, wherein in order to have no buffering in the second controller stack, a parameter related to a sub interval in the HCI command information is configured to a specific value, the parameter related to the sub interval defines an interval between successive sub events within one isochronous event, and the parameter related to the sub interval is related to buffering in the first controller stack of the plurality of PDUs before an isochronous streams (ISO) interval.

11. The method of claim 7, wherein each of the plurality of PDUs is transported from the second processor to the first processor within the sub interval after receiving each of the plurality of PDUs.

12. A first apparatus in a short-range wireless communication system, the first apparatus comprising:

a first processor corresponding to a host stack; a second processor corresponding to a first controller stack; a memory; and a transceiver, wherein the host stack and the first controller stack are connected through a host controller interface (HCI), wherein the memory store instructions for performing operations based on being executed by the first processor and the second processor, and wherein the operations includes:

in relation to data transport from the first controller stack of the first apparatus to a second controller stack of a second apparatus, transporting, from the first processor to the second processor, HCI command information configured so that there is no buffering in the first controller stack;

transporting a plurality of service data units (SDUs) generated by the first processor to the second processor—each of the plurality of SDUs is transported to the second processor apart at each configured sub interval—; and based on the HCI command information, transporting, by the transceiver, each of a plurality of protocol data units (PDUs) based on each of the plurality of SDUs to the second apparatus without buffering after each of the plurality of SDUs is received by the second processor, wherein transport of the plurality of PDUs is performed within one isochronous event, wherein the HCI command information includes feature set information including a No buffering feature bit, and wherein buffering of the plurality of SDUs in the first controller stack before an isochronous streams (ISO) interval is disabled based on the No buffering feature bit.

* * * * *